May 2, 1939.  R. R. R. SARAZIN  2,156,484
DEVICE FOR IMPARTING IMPULSES TO A SYSTEM
Filed Oct. 22, 1937   3 Sheets-Sheet 1
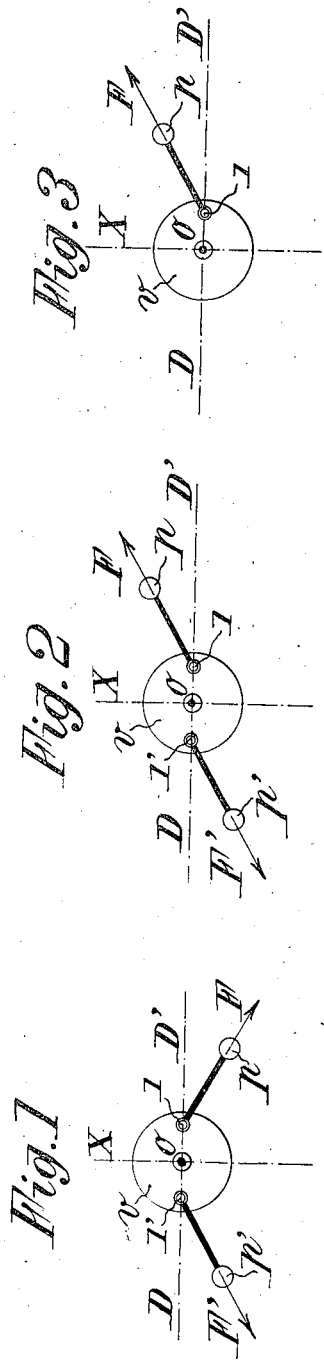
Inventor:
Raoul Roland Raymond Sarazin,
Bailey & Pearson
Attorneys

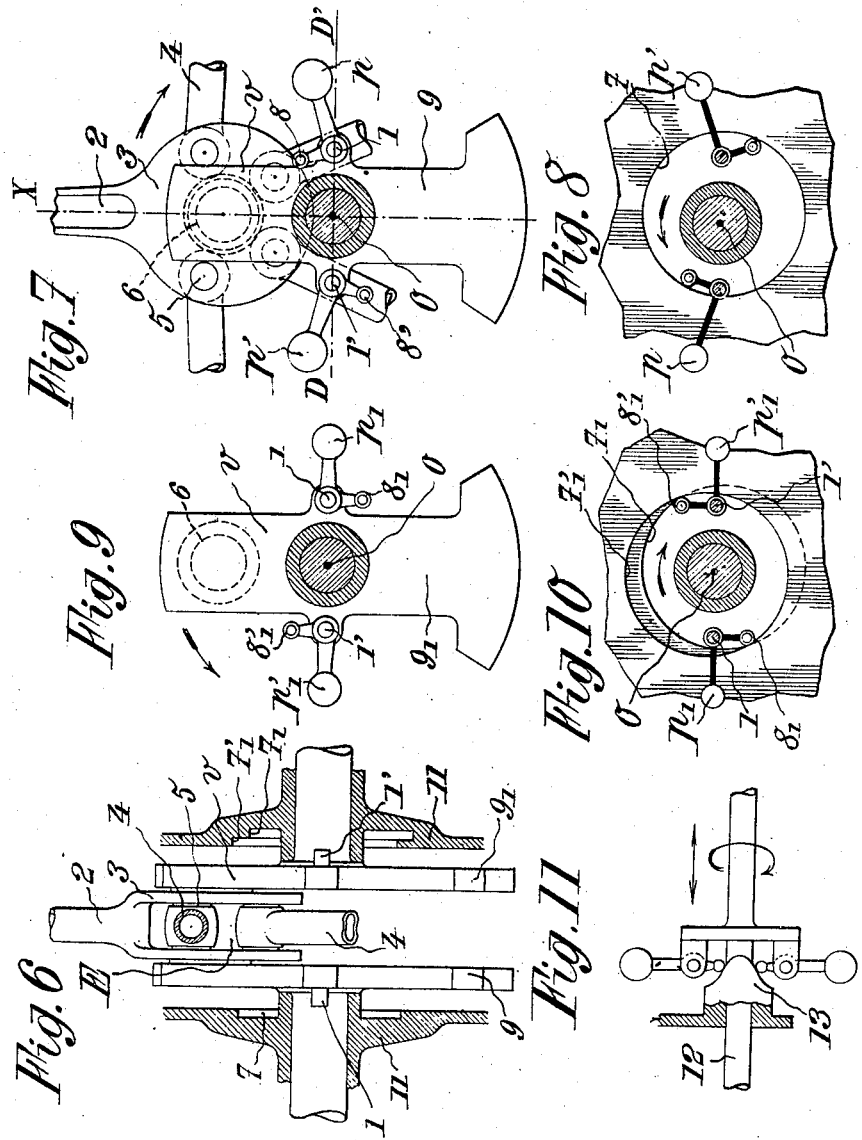

May 2, 1939.  R. R. R. SARAZIN  2,156,484
DEVICE FOR IMPARTING IMPULSES TO A SYSTEM
Filed Oct. 22, 1937  3 Sheets-Sheet 3
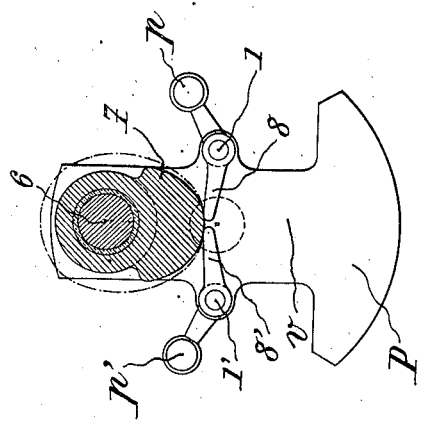
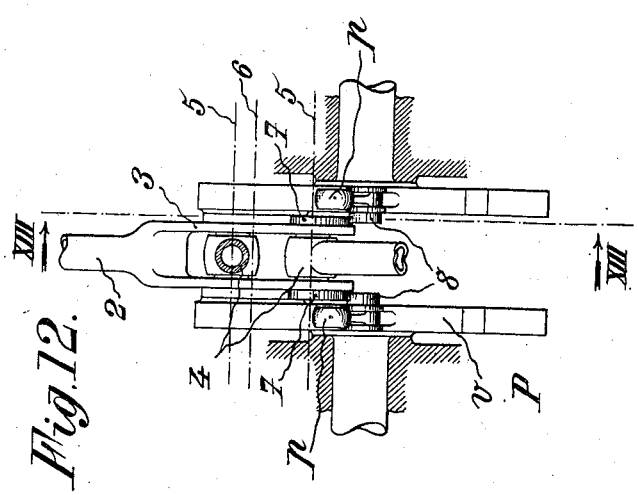
Inventor:
Raoul Roland Raymond Sarazin,
Bailey
Attorneys Patented May 2, 1939

2,156,484

UNITED STATES PATENT OFFICE 2,156,484

DEVICE FOR IMPARTING IMPULSES TO A SYSTEM

Raoul Roland Raymond Sarazin, Saint-Prix, France

Application October 22, 1937, Serial No. 170,504
In Luxemburg August 5, 1937

14 Claims. (Cl. 74—604)

The present invention relates to devices for imparting impulses to a system, and it is especially, although not exclusively, concerned with devices of this kind which produce impulses intended to balance, at least partly, the kinematic system of the crankshaft of a reciprocating motion machine. The invention is more particularly applicable to internal combustion engines having their cylinders arranged either in fan-like fashion, with two or more branches, or in simple or multiple radial arrangement, and more especially to engines the kinematic system of which includes a master connecting rod and a plurality of auxiliary connecting rods.

The essential feature of the present invention consists in making use of pendular systems mounted on the structure to which the impulses are to be imparted and in combining with these pendular systems means for producing an oscillatory movement thereof, the characteristics of these pendular systems, and in particular their period, their relative positioning and their connection with said structure, being chosen in such manner that the resultant of the forces of inertia that act thereon produces the desired impulses on said structure.

According to another feature of the present invention, when it is desired to dampen the vibrations of an assembly, comprising a rotary structure, which is submitted to a pulsatory force of order $n$ directed along a radius of said rotary structure, the device for imparting compensating impulses to said rotary structure includes two pendular systems eccentrically pivoted to said rotary structure so as to be able to oscillate about axes parallel to the axis of said structure, said axes being situated on either side of the radial plane containing said radius, and the natural frequency of said pendular system when the angular velocity of the rotary structure is $\Omega$ is made to correspond substantially to $n\Omega$.

Other features of the present invention will result from the following detailed description of some specific embodiments thereof.

Preferred embodiments of the present invention will be hereinafter described, with reference to the accompanying drawings, given merely by way of example, and in which:

Figs. 1, 2, and 3 are diagrammatical views illustrating the principle of the device according to the invention;

Figs. 4 and 5 are other diagrammatical views illustrating two other embodiments of the present invention;

Fig. 6 is a side view of the connecting rod system of a radial engine provided with a balancing device made according to the present invention, the pendulums being removed;

Figs. 7, 8, 9 and 10 are detail views showing separately certain elements of the connecting rod system in question;

Fig. 11 shows a device made according to the present invention for deadening the longitudinal vibrations of an engine crankshaft;

Fig. 12 is a diagrammatic side view of the connecting rod system of a radial engine fitted with a balancing system according to the invention;

Fig. 13 is a sectional view on the line 13—13 of Fig. 12.

In the following description, it will be supposed that it is desired to provide a device for imparting impulses to a member with a view to compensating, at least partly, certain pulsatory perturbing impulses (torques or forces of various natures) which are undergone by said member.

According to the invention, I make use of at least one pendular system, which is mounted on said member or on an element carried by said member, this system including one or several pendulums.

This pendular system is devised and arranged in such manner that, supposing it is moving with the desired frequency and amplitude, it produces, on the member to be balanced, under the effect of the field of forces to which it is subjected, impulses which are at any time opposed in direction, and preferably equal to those to be compensated for at least partly, which can always be determined by calculation.

And I provide means for producing the oscillatory movement of this pendular system, these means consisting, in most cases, merely of a device for maintaining the oscillation to the natural frequency of every pendulum in the field of forces to which it is subjected, but which is also capable, if so desired, to produce an oscillatory movement of the pendular system at a frequency which is different from its own frequency.

Of course, in order to give this field of forces a high intensity, it is advantageous to mount the pendulums on a rotating element, whereby the pendulums are subjected to the action of the centrifugal force.

According as the case may be, the pendulums are arranged to oscillate in one of the following manners:

*a.* Either in planes at right angles to the axis of revolution of the rotary element, which permits of producing pulsatory forces or torques located in said planes;

b. Or in radial planes, which permits for instance of producing pulsatory forces directed along the axis of revolution itself;

c. Or, again, in such manner that the center of gravity of the pendulums moves in any other planes or even any other surfaces than planes at right angles to the axis of revolution or radial planes.

It will be readily understood that the invention can advantageously be utilized for imparting to the crankshaft $v$ of an engine impulses capable of compensating, at least partly, at least some of the perturbing impulses to which it is subjected as a consequence of the lack of balance of the kinematic system connected therewith.

It is known that, if the forces or torques which exert a perturbing action on a crankshaft $v$ are referred to axes rigid with said crankshaft, it is found that these perturbing impulses are of a pulsatory nature.

They consist either of pulsatory torques coaxial with the crankshaft, or of rotating pulsatory forces and their nature (period and intensity) depends upon the type of engine that is considered.

According to the present invention, having chosen one of these impulses, which it is desired to compensate at least partly, I proceed in the following manner:

I fit on the crankshaft $v$ at least one pendular system capable of oscillating in at least one plane at right angles to the axis of revolution of said crankshaft;

And I combine with this pendular system a device capable of maintaining its oscillations during the rotation of said crankshaft, the characteristics of said pendular system, and in particular, the period thereof, its relative positioning, and its connection with the crankshaft, being chosen in such manner that the resultant of the forces of inertia acting thereon, when the pendulums oscillate with their own frequencies in the field of the centrifugal force, produces the desired compensating impulses on the crankshaft $v$ that is to be balanced.

Of course, when it is desired to compensate on a crankshaft a separate radial pulsatory force or a separate pulsatory torque coaxial with the crankshaft, the pendulums must be arranged according to either of the two following arrangements:

a. Either they are distributed symmetrically about the axis O of the crankshaft;

b. Or they are balanced in the centrifugal field by suitable eccentric masses rigid with said crankshaft, which can practically be obtained in view of the relatively low amplitude of the oscillations of said pendulums.

With these arrangements, the whole of the pendular system gives rise to no other pulsatory torque or force than those necessary for compensating, at least partly, the perturbing torque or the perturbing force that it is desired to compensate for.

In order to simplify the description of the invention, it will be first supposed that the pendular system consists of two monofilar pendulums $p$ and $p'$, diametrically opposed, pivotally mounted on crankshaft $v$, for instance on a web thereof.

Concerning now the characteristics of such a system, that is to say, in particular, the period, the relative positioning, and the connection with crankshaft $v$ of pendulums $p$ and $p'$, they are chosen different according as it is desired to compensate perturbing forces or torques, also according to the nature of these forces or torques.

For instance, if it is desired, first, to compensate a periodical pulsatory force carried by a radial vector OX turning together with crankshaft $v$ about the axis O thereof, as it is illustrated by Fig. 1, I employ the following arrangement:

The axes of articulation $l$ and $l'$ of pendulums $p$ and $p'$, which axes are parallel to axis O, are mounted symmetrically with respect to axis O in a plane P at right angles to vector OX.

These pendulums are arranged in such manner that there is always half a period of difference between them, that is to say they are always located on the same side of plane DD'.

They are made to have a period corresponding to the type of engine that is considered, as it will be hereinafter more explicitly explained with reference to the device to be provided for maintaining the oscillations of said pendulums. In all cases, this period must be equal to that of the pulsatory force to be compensated.

Considering now these pendulums when they pass through one of their positions that are at the maximum angular interval from their position of equilibrium (position shown in the drawings) it is found that these forces are two forces F and F' symmetrical with respect to OX and therefore the projections of which on said line OX are at any time added to each other in magnitude, the resultant of said projections being a pulsatory force having the same period as said pendulums.

It will be readily understood that it is possible, by suitably choosing the masses of pendulums $p$ and $p'$, to obtain that this resultant is constantly equal in magnitude and opposed in direction to the perturbing pulsatory force that it is desired to compensate.

Now, if it is desired to compensate no longer a pulsatory force but a pulsatory torque, I proceed substantially in the same manner, with the difference that axes $l$ and $l'$ can be located on any diameter. These pendulums $p$ and $p'$ are then arranged to be in phase (case of Fig. 2) so that forces F and F' give rise to a pulsatory torque, the masses of these pendulums being chosen in such manner that this torque is at any time equal and opposed to the torque to be compensated.

It should be noted that I might eventually, with a single pendular system or a plurality of such systems disposed in disymmetric arrangement about axis O, simultaneously compensate a pulsatory force and a pulsatory torque, provided, however, that they are both of the same period and suitably positioned relatively to each other.

It would suffice, for this purpose, to choose in such manner the characteristics of pendulum $p$ (case of Fig. 3) that the projection of F on OX compensates the pulsatory perturbing force and the moment of F with respect to O compensates the pulsatory perturbing torque.

It has been assumed, in order to simplify the explanations, that the compensating pendulums were monofilar pendulums, but it should be well understood that this is not a necessary condition. For instance, the pendulums might be bifilar pendulums, as diagrammatically shown by Fig. 4, and as it will be hereinafter indicated with respect to the application of the invention to an engine including a master connecting rod and auxiliary connecting rods. In particular, this solution permits of reducing the length of the pendulums as much as this may be practically necessary for giving said pendulums high frequencies.

Concerning now the device to be provided for maintaining the oscillations of pendulums $p$ and $p'$ when crankshaft $v$ rotates, it is of course necessary, in order to determine it, to take into account the number of complete oscillations that must be made by said pendulums in order to produce the desired compensating effect, this number depending, for each type of engine, upon the order of the perturbing harmonic that it is desired to reduce to zero.

Of course, as already explained, I will try merely to compensate those of the harmonic vibrations the effect of which is most disturbing.

For instance, in the case, which will be hereinafter more specifically considered, in which the engine includes a master connecting rod 2 (Fig. 6) having a head 3 to which the big ends of the auxiliary connecting rods 4 are pivoted about axes 5 different from the axis of the crank pin 6, the pulsatory perturbing force that it is most interesting to compensate, in the case of a radial engine, is of a frequency equal to the number of revolutions per unit of time of the crankshaft $v$.

This involves the following consequences:

Pendulums $p$ and $p'$ are arranged in such manner that their own period corresponds to a complete oscillation per revolution of the crankshaft;

On the other hand, the device for controlling these pendulums must be devised in such manner that they are given an impulse per revolution of the crankshaft.

On the contrary, in the case of V-shaped engines with twelve cylinders, or of W engines with eighteen cylinders, with a master connecting rod and auxiliary connecting rods, the main perturbing force to be compensated has a frequency which is three times the one precedingly considered, which leads to providing a controlling device capable of acting three times per revolution on pendulums $p$ and $p'$.

When it is desired to compensate several vibrations of different orders on the same crankshaft, I must therefore provide a number of compensating devices made as just above described equal to the number of vibrations to be compensated, the oscillations of each of these systems being maintained through a distinct device, respectively, and the characteristics of each of them being determined by the frequency of the vibration to the compensation of which they are intended.

Although I may consider many solutions for constituting said control devices, it seems that it is more particularly advantageous to constitute each of them by a fixed cam 7 which is caused to coact periodically with suitable members 8 (consisting for instance of fingers provided with rollers) connected or fixed with the compensating pendulums. According to the construction of the engine, this cam is either external (Fig. 4) or internal (Figs. 6 to 10) with respect to members 8.

This cam will be provided with a number of bosses or projections equal to the number of complete oscillations per revolution of the crankshaft to be made by the corresponding pendulums. For instance, in the case of a radial engine (Fig. 5) the cam includes a single $b^1$, and in the case of a V engine (Fig. 4) it includes three bosses or projections $b^1$, $b^2$ and $b^3$. This cam will be secured to the engine frame through any suitable means.

In any case, the parts are preferably arranged in such manner that the cams in question attack tangentially the member connected to each of the pendulums and that they accompany this member for at least a portion of its period.

By proceeding in the manner above set forth, I obtain a device capable of being employed for compensating, or an engine crankshaft, any perturbing pulsatory force or torque, the adaptation of this device to every particular case being made by taking into account, as above described, the specific characteristics (nature, intensity, period, relative disposition) of the disturbing factor or factors to be compensated.

I will indicate in the following description, by way of example, a solution for the adaptation of said device to the case of a radial engine E with a master connecting rod and auxiliary connecting rods, as above described and diagrammatically illustrated by Figs. 6 to 10.

It will be supposed, for the sake of simplicity, that the only perturbing factors that it is practically interesting to compensate on the crankshaft $v$ of this engine are, on the one hand, a pulsatory force carried by the vector OX turning together with the crankshaft, and, on the other hand, a pulsatory torque the axis of which is O and the frequency of which is 1 with respect to the speed of revolution of the crankshaft.

Concerning first the pulsatory force, I provide, for compensating it, a pendular system constituted in a manner similar to that illustrated by the diagram of Fig. 1.

For this purpose, I have found that it is advantageous to have recourse, in order to connect the pendular masses $p$, $p'$ to one of the webs 9 of the crankshaft, to connecting rods capable of pivoting at one of their ends about axes carried by the outer sides of said webs, the two axes $i$, $i'$ necessary for supporting the two masses being situated parallel to each other on either side of axis O in a plane perpendicular to vector OX.

The connecting rods that carry each mass are each provided with a prolonged part or finger carrying a roller 8, 8' extending laterally toward the outside, in such manner that the two respective rollers relating to each of the pendulums move in the same plane distinct from the zone in which pendulums $p$, $p'$ themselves are moving.

Finally, the casing 11 of the engine (Figs. 6 and 8) is provided with an exterior cam 7 which is adapted to coact with rollers 8 and 8' respectively, in such manner that the pendulums, when oscillating on either side of the plane DD' at right angles to OX, pass simultaneously through their extreme upper position (position shown by Fig. 7) when the crank pin passes through the upper end of its stroke with respect to the master connecting rod, that is to say at the time at which the perturbing pulsatory force passes through its maximum.

Concerning now the pulsatory torque, I may have recourse, for producing it, to a pendular system constituted by two monofilar pendulums $p_1$ and $p_1'$ (Fig. 9) the axes of articulation $i$ and $i'$ of which are carried by the outer face of the other web $9_1$ of the crankshaft $v$. These pendulums are arranged in relative positions with respect to each other corresponding to the diagrammatic arrangement of Fig. 2, and at intervals, with respect to pendulums $p$ and $p'$, corresponding to the angular interval existing between the pulsatory force and the pulsatory torque to be compensated, which angular interval is generally equal to 90°.

I provide, for maintaining the oscillations of these pendulums, two cams $7_1$ and $7_1'$ (Figs. 6 and 10) constituted in a manner analogous to cam 7, in such manner as to coact, the first with at least one roller $8_1$ carried by a finger fixed to pendulum $p_1$, and the second with at least one finger $8_1'$ carried by a finger fixed to pendulum $p_1'$. Of course, in this case, these cams are provided in different planes outside of the region in which pendulums $p_1$ and $p_1'$ are moving.

Of course, the compensating systems for the balancing of the disturbing torque might be carried by members other than the webs of the crankshaft, and, in particular, by any suitable support keyed on said crankshaft.

In this way, I obtain a radial engine for which the perturbing effects exerted upon the crankshaft are compensated to a considerable amount, and therefore an engine the frame of which is practically protected against any injurious vibration capable of deteriorating the fixation elements of said engine or the structure on which said engine is mounted.

In any case, and whatever be the type of the engine on which the device just above described is applied, this device involves many serious advantages, among which the following may be cited:

This device can easily be adapted to compensate any periodical perturbing factor;

It is strong and simple, which ensures a great safety of operation;

Its volume and weight are relatively small as a consequence of the fact that the centrifugal field acting upon the pendulums is very important.

Only very small efforts are necessary for maintaining the oscillations of the pendular systems, these efforts being merely intended to suffice to compensate the losses of energy by friction that take place as a consequence of the oscillation of the pendulums, so that, for practical purposes, there is neither fatigue nor wear of the balancing mechanism.

Finally, the device adapts itself automatically to all working conditions of the engine, as a consequence of the fact that the period of the pendular systems is a function of the centrifugal acceleration, therefore of the working conditions of the engine, which is tantamount to saying that, if these systems are established in such manner as to make, for instance, a complete oscillation per revolution for a given speed, they make one oscillation per revolution at all speeds, the amplitude remaining constant same as the ratio of the perturbing effect and the correcting effect.

It should also be noted that, in the case of double radial engines, the compensating devices may advantageously, for balancing reasons, be mounted on the end webs of the crankshaft, on portions of said webs which are preferably substantially symmetrical with reference to the axis of said crankshaft.

In a general manner, and especially in the case of a simple row of cylinders in a radial engine, I might advantageously substitute to a single pendular system mounted on one face of a web, a double system equivalent to the preceding one and distributed symmetrically on each of the faces of said web.

Of course, the embodiments above described might undergo various modifications, among which the following may be cited:

It might be desired to absorb the perturbing effects to which is subjected a member turning at a given speed by means of a pendular system carried by a shaft turning at a different speed.

I might also desire to create vibrations by making use of pendulums of any suitable type connected in such manner to a rotary shaft 12 that they are compelled to oscillate, preferably with their own period of oscillation, in radial planes (Fig. 11), for instance owing to a cam 13 which maintains their oscillation, which produces a vibration coaxial to the shaft.

I might also desire, instead of compensating the perturbing vibrations, to create vibrations, for instance in order to vibrate or oscillate an element such as a jarring table and the like, in which case I make use of mechanisms identical to those above described, producing pulsatory vibrations or impulses which are not intended to compensate already existing impulses of opposed directions.

Although, in the preceding embodiments, the cam or analogous element which controls the oscillations of the pendulums is fixed to the frame of the engine, this is not a necessary feature of the present invention.

For instance, as shown by Figs. 12 and 13, cam 7 may be carried by a movable part of the engine, such as an element of the system of connecting rods, and preferably the big end 3 of the master connecting rod 2 of said engine.

It will be readily understood that, neglecting the slight oscillating movement of connecting rod 2 on either side of the median position thereof when the engine is running, everything takes place as if the whole of the crankshaft, and therefore also pendulums $p$ and $p'$ and their operating fingers turned about cam 7, which, as a matter of fact, can be given a shape such that it compensates the slight perturbing effects as might result from the oscillating movement of the master connecting rod.

Said cam therefore acts exactly in the same manner as the stationary cams fixed with respect to the engine frame, as described in the preceding embodiments.

Although I may also, taking into account what has been above set forth, provide many other embodiments of such a cam, especially concerning its fixation to the small end of the connecting rod 3, and also its position with respect to the ends 8 of the fingers thereof, I think it is advantageous to make use of the arrangement illustrated by the drawing (Figs. 12 and 13).

Cams 7 are carried by the side faces of the big end of connecting rod 3, said cams being located in a plane adjacent to each of the counterweights P of the crankshaft and slightly in projection with respect to said side faces, in such manner that the ends 8 of the fingers can move along the path shown in dotted lines on the drawings.

A set of two pendulums $p$ and $p'$ is mounted on the lateral faces of each of the webs of the crankshaft, the fingers 8 and 8' being then bent toward the inside of the webs in such manner as to be able to coact with the corresponding cam 7 and the ends of said fingers being as close as possible to each other, in order that the phase difference between the movements of the two pendulums (due to the fact that the ends 8 and 8' do not coincide) can be considered as negligible for practical purposes.

It should be noted that I might even eliminate this difference of phase by locating the control fingers in different planes and taking care that one of their ends 8 and 8' comes into contact with the same generatrix of cam 7.

In addition to the advantages above set forth, this embodiment has the advantage that it includes no member to be fixed to the stationary parts of the engine that is to say is easier to make and occupies a smaller volume.

Of course, the arrangement disclosed with respect to Figs. 12 and 13 might also be applied, with a mere modification of the relative positions of the pendulums, for compensating a pulsatory torque, instead of a force.

In a general manner, while I have, in the above description, disclosed what I deem to be practical and efficient embodiments of the present invention, it should be well understood that I do not wish to be limited thereto as there might be changes made in the arrangement, disposition, and form of the parts, without departing from the principle of the present invention as comprehended within the scope of the accompanying claims.

What I claim is:

1. A device for imparting periodical impulses to a rotary structure, which comprises, in combination, at least one pendular system eccentrically carried by said structure so as to rotate therewith, at the mean speed thereof, and means operative by the movement of said structure for keeping said pendular system in oscillation, with a median position substantially radially situated relatively to the axis of rotation of the rotary structure.

2. A device for imparting periodical impulses to a rotary structure, which comprises, in combination, at least one pendular system eccentrically carried by said structure so as to rotate therewith, at the mean speed thereof, and means operative by the movement of said structure for keeping said pendular system in oscillation, with a median position substantially radially situated relatively to the axis of rotation of the rotary structure, said pendular system comprising a mass and two connecting and guiding means between said mass and said rotary structure, said guiding means restraining the movement of any two points of said mass relatively to said rotary structure to two identical arcuate paths situated in parallel planes.

3. A device for imparting periodical impulses to a rotary structure, which comprises, in combination, at least one pendular system eccentrically carried by said structure so as to rotate therewith, at the mean speed thereof, and means operative by the movement of said structure for keeping said pendular system in oscillation, with a median position substantially radially situated relatively to the axis of rotation of the rotary structure, at a frequency proportional to the angular velocity of the rotary structure.

4. A device for imparting periodical impulses to a rotary structure, which comprises, in combination, at least one pendular system eccentrically carried by said structure so as to rotate therewith, at the mean speed thereof, and means operative by the movement of said structure for keeping said pendular system in oscillation, substantially at its natural frequency in the field of centrifugal force, with a median position substantially radially situated relatively to the axis of rotation of the rotary structure.

5. A device for imparting periodical impulses to a rotary structure, which comprises, in combination, at least one pendular system eccentrically carried by said structure so as to rotate therewith, at the mean speed thereof, and means operative by the movement of said structure for keeping said pendular system in oscillation, substantially at its natural frequency in the field of centrifugal force, with a median position substantially radialy situated relatively to the axis of rotation of the rotary structure, so that its center of gravity oscillates in a plane perpendicular to said axis of rotation.

6. A device for imparting periodical impulses to a rotary structure, which comprises, in combination, at least one pendular system eccentrically carried by said structure so as to rotate therewith, at the mean speed thereof, and means operative by the movement of said structure for keeping said pendular system in oscillation, substantially at its natural frequency in the field of centrifugal force, with a median position substantially radially situated relatively to the axis of rotation of the rotary structure, so that its center of gravity oscillates in a plane containing said axis of rotation.

7. A device for imparting periodical impulses to a rotary structure, which comprises, in combination, at least one pendular system eccentrically carried by said structure so as to rotate therewith, at the mean speed thereof, and means operative by the movement of said structure for keeping said pendular system in oscillation, substantially at its natural frequency in the field of centrifugal force with a median position substantially radially situated relatively to the axis of rotation of the rotary structure, said means comprising a cam movable relatively to said rotary structure, said cam being adapted to cooperate with said pendular system.

8. In connection with an assembly comprising a rotary structure, said assembly being submitted to periodical impulses corresponding to a pulsatory force of order $n$ directed along a radius of said rotary structure, a balancing device which comprises, in combination, two pendular systems eccentrically pivoted to said rotary structure so as to rotate therewith at the mean speed thereof and so as to be able to oscillate about axes parallel to the axis of said structure, said axes being situated on either side of the radial plane containing said radius, and the natural frequency of said pendular systems when the angular velocity of the rotary structure is $\Omega$ being substantially equal to the product of $n$ by $\Omega$.

9. In connection with an assembly comprising a rotary structure, said assembly being submitted to periodical impulses corresponding to a pulsatory force of order $n$ directed along a radius of said rotary structure, a balancing device which comprises in combination two pendular systems eccentrically pivoted to said rotary structure so as to rotate therewith at the mean speed thereof and so as to be able to oscillate about axes parallel to the axis of said structure, said axes being symmetrically situated relatively to a radial plane containing said radius, and the natural frequency of said pendular systems when the angular velocity of the rotary structure is $\Omega$ being substantially equal to the product of $n$ by $\Omega$.

10. In connection with an assembly comprising a rotary structure, a balancing device which comprises in combination two pendular systems eccentrically pivoted to said rotary structure so as to rotate therewith at the mean speed thereof and so as to be able to oscillate about axes parallel to the axis of said structure and means for keeping said pendular systems in oscillation out of phase with one another with the same frequency proportional to the angular velocity of the rotary structure and each with a median position substantially radially situated relatively to the axis of rotation of the rotary structure.

11. In connection with an engine comprising a crankshaft having a crankpin, a master connecting rod associated with said crankshaft, and at least one auxiliary rod, a balancing device which comprises in combination, two pendular systems eccentrically pivoted to said crankshaft so as to rotate therewith at the mean speed thereof and so as to be able to oscillate about axes parallel to the axis of said crankshaft, said axes being situated on either side of the radial plane containing the axis of the crankpin, and the natural frequency of said pendular systems corresponding substantially to one complete oscillation per revolution of the crankshaft.

12. In connection with an engine comprising a crankshaft having a crankpin, a master connecting rod associated with said crankshaft, and at least one auxiliary connecting rod, a balancing device which comprises in combination, two pendular systems eccentrically pivoted to said crankshaft so as to rotate therewith at the mean speed thereof and so as to be able to oscillate about axes parallel to the axis of said crankshaft, said axes being situated on either side of the radial plane containing the axis of the crankpin, and the natural frequency of said pendular systems corresponding substantially to one complete oscillation per revolution of the crankshaft, and means for oscillating said pendular systems once for each revolution of the crankshaft with a median position substantially radially situated relatively to the axis of rotation of the crankshaft and so that the centers of gravity of said pendular systems occupy simultaneously their positions substantially nearest to the crankpin when said master connecting rod is at its top dead center.

13. In connection with an assembly comprising a rotary structure, said assembly being submitted to periodical impulses corresponding to a perturbing pulsatory torque of order $n$ located in a plane perpendicular to the axis of said rotary structure, a balancing device which comprises in combination at least one pendular system eccentrically pivoted to said rotary structure so as to rotate therewith at the mean speed thereof and so as to be able to oscillate about an axis parallel to the axis of said structure, the natural frequency of said pendular system when the angular velocity of the rotary structure is $\Omega$ being substantially equal to the product of $n$ by $\Omega$, and means for keeping said pendular system in oscillation substantially at its natural frequency with a median position substantially radially situated relatively to the axis of rotation of the rotary structure, the angular setting of said means being such that the reaction torque resulting from the oscillation of said pendular system compensates at least partly said perturbing pulsatory torque.

14. In connection with an engine comprising a crankshaft having a crankpin, a master connecting rod associated with said crankshaft, and at least one auxiliary connecting rod, a balancing device which comprises in combination at least one pendular system eccentrically pivoted to said rotary structure so as to rotate therewith at the mean speed thereof and so as to be able to oscillate about an axis parallel to the axis of said structure, the natural frequency of said pendular system corresponding substantially to one complete oscillation per revolution of the crankshaft, and means for oscillating said pendular system once for each revolution of the crankshaft with a median position substantially radially situated relatively to the axis of rotation of the crankshaft, the angular setting of said means being such that the reaction torque resulting from the oscillation of said pendular system has a zero value when said master connecting rod is substantially at its upper and lower dead centers.

RAOUL ROLAND RAYMOND SARAZIN.